A. A. SCHRADER.
CAR STEP.
APPLICATION FILED APR. 15, 1911.

1,004,475.

Patented Sept. 26, 1911.
2 SHEETS—SHEET 1.

Inventor
Anna A. Schrader.

Witnesses
William Smith.

By Victor J. Evans
Attorney

A. A. SCHRADER.
CAR STEP.
APPLICATION FILED APR. 15, 1911.

1,004,475.

Patented Sept. 26, 1911.
2 SHEETS—SHEET 2.

Witnesses
William Smith

Inventor
Anna A. Schrader.

By Victor J. Evans
Attorney

UNITED STATES PATENT OFFICE.

ANNA A. SCHRADER, OF MOUNT OLIVE, ILLINOIS.

CAR-STEP.

1,004,475.

Specification of Letters Patent.

Patented Sept. 26, 1911.

Application filed April 15, 1911. Serial No. 621,290.

*To all whom it may concern:*

Be it known that I, ANNA A. SCHRADER, a citizen of the United States, residing at Mount Olive, in the county of Macoupin and State of Illinois, have invented new and useful Improvements in Car-Steps, of which the following is a specification.

This invention relates to car steps, the object of the invention being to provide an extensible supplemental step which may be readily adjusted or extended so as to lie beneath the lowermost fixed step and to be disposed in relative close proximity with the ground, thus insuring the passenger or traveler against injury when stepping on or off of a car.

Another object of the invention is to provide mechanism adapted for operation to quickly and readily extend the supplemental step to its operative position, the said means including a locking member and means for engaging the same to hold the step normally in an elevated position beneath the lowermost main step.

Figure 1:
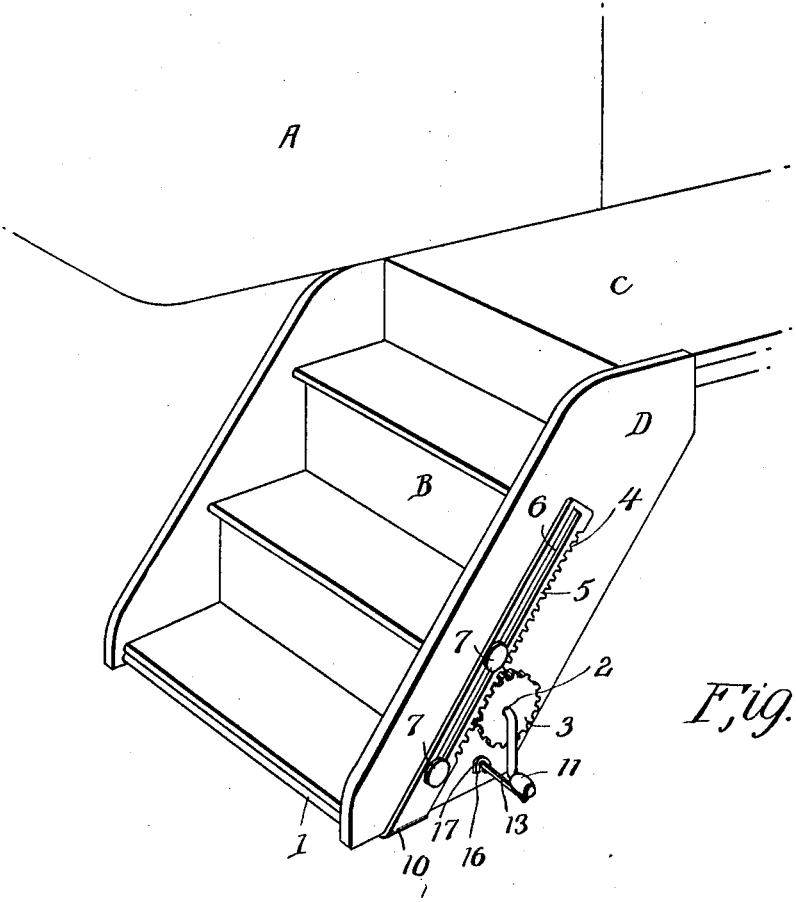
Figure 5:
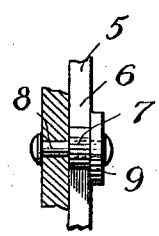
Figure 4:
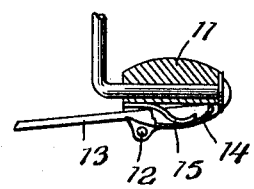
Figure 2:
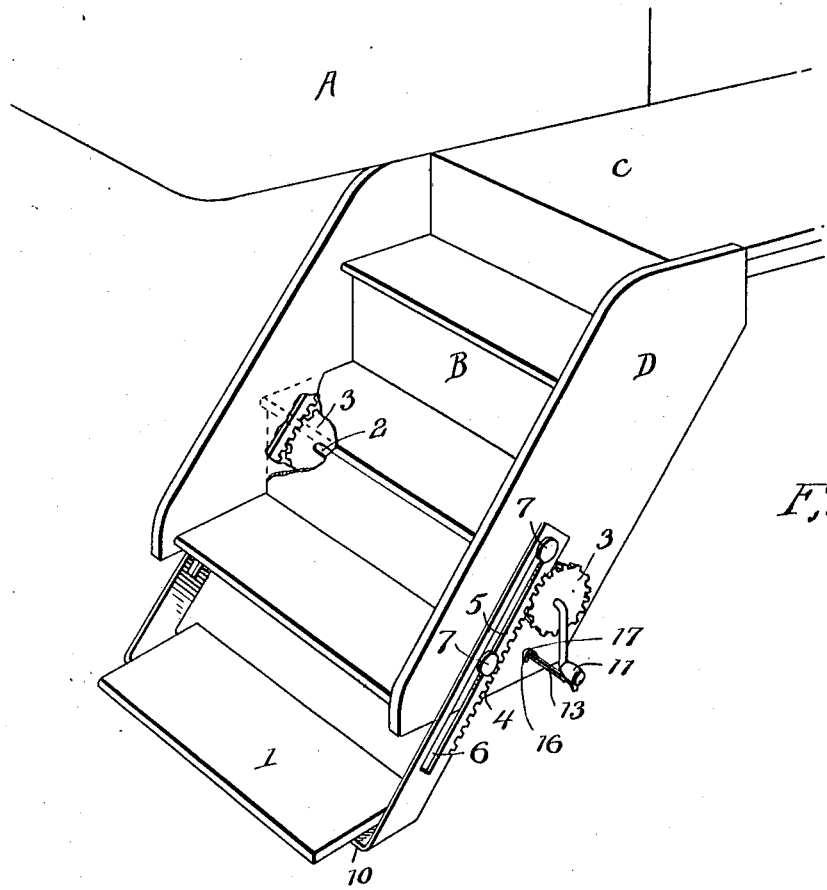
Figure 3:
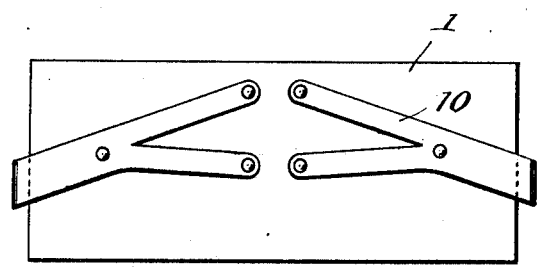

In the drawings, forming a portion of this specification and in which like numerals of reference indicate similar parts in the several views:—Figure 1 is a perspective view of my improved car step in position on a car, the supplemental step being in an elevated position. Fig. 2 is a similar view showing the supplemental step in its extended position. Fig. 3 is an inverted perspective view of the supplemental step. Fig. 4 is a section through the controlling handle and through the locking member. Fig. 5 is a section on line 5—5 of Fig. 1.

In the drawings, the car A has the usual steps B extending downwardly from one side of the platform C. The lowermost step is disposed slightly above the lower end of the side members D, and as shown in Fig. 1 of the drawings, the supplemental or extensible step 1 is located directly beneath the said supplemental step and disposed between the lower extensions of the side members D so as to be housed thereby, preventing the supplemental step from forming an obstruction when the rolling stock is in motion.

A horizontal shaft 2 extends through the side members D of the main car steps, being suitably journaled in the side members so that the shaft can be readily rotated. Secured to the shaft are gear wheels 3, being located immediately at the sides of the members D of the main car steps and engaged with the rack portions 4 of the sliding supports 5. These supports are provided with longitudinally extending slots 6 through which the antifriction rollers 7 extend. These rollers are mounted on suitable studs 8 which extend from the side members D, and as illustrated, each roller is provided with an exteriorly located enlarged guard portion 9. The guard portions of the rollers are disposed outermost on the guide members 5 and each is of a diameter exceeding that of the slots 6 so as to hold the guide 5 operatively associated with its side member D. The lower ends of the guide members 5 are provided with horizontal bracket portions 10 which are secured to the underside of the supplemental step 1.

The controlling shaft 2 is provided at one end with a crank handle 11 and pivoted to the handle, at 12, is a locking member 13. This member is provided with an actuating portion 14 which is located in such position with respect to the handle 11 so as to be engaged therewith by the hand of the operator. A spring 15 is mounted on the handle 11, the free end of which bearing against the portion 14 of the locking member, the spring exerting its tension to hold the member engaged between the walls 16 of the substantially U-keeper member 17 on one of the side members D hereinbefore described.

From the construction herein disclosed, and on reference particularly to Fig. 1 of the drawings, it will be understood that on the normal position of the supplemental step the handle 11 of the controlling shaft will be in a position with respect to the keeper 17 to permit the locking member 13 to be engaged therewith, such engagement serving to lock the controlling shaft against rotation and to hold the supplemental step securely confined against the lowermost main step of the car. When passengers are getting off or on the car the supplemental step is lowered so as to be disposed in close proximity to the ground. On operation of the device to lower the supplemental step, if is obvious that when the handle 11 is grasped for the purpose of rotating the shaft 2 the portion 14 of the actuating member will be engaged by the hand and actuated thereby so that the member will be moved out of engagement with the hereinbefore described keeper member 17. The antifriction rollers 7 are arranged so that the uppermost rollers form stops to limit the downward adjustment of the supplemental step.

I claim:—

An extensible step for cars comprising a movable step carrying member, gearing for operating the member, a controlling handle for the operating gearing, a substantially U-shaped keeper located adjacent the gearing, a locking means carried by the handle and adapted to engage the said keeper, the said means comprising a horizontally disposed arm pivotally connected to the underside of the handle and provided with an extended or actuating portion, a spring mounted on the handle, the said spring having its free end bearing against the actuating portion of the said arm whereby to hold the arm engaged between the walls of the said keeper so as to hold the movable member against movement.

In testimony whereof I affix my signature in presence of two witnesses.

ANNA A. SCHRADER.

Witnesses:
   ALVIN J. IRVINE,
   FRED SCHRADER.

---

Copies of this patent may be obtained for five cents each, by addressing the "Commissioner of Patents, Washington, D. C."